(12) United States Patent
Liu et al.

(10) Patent No.: US 10,132,067 B2
(45) Date of Patent: *Nov. 20, 2018

(54) MAJOR WATER LEAK PREVENTION APPARATUS FOR WATER INLET VALVE

(71) Applicant: Lab (Xiamen) Sanitary Fittings Inc, Xiamen (CN)

(72) Inventors: Yongmao Liu, Xiamen (CN); Zipeng Zhang, Xiamen (CN)

(73) Assignee: LAB (XIAMEN) SANITARY FITTINGS INC, Xiamen, Fujian (CN)

( * ) Notice: Subject to any disclaimer, the term of this patent is extended or adjusted under 35 U.S.C. 154(b) by 52 days.

This patent is subject to a terminal disclaimer.

(21) Appl. No.: 15/039,851

(22) PCT Filed: Jun. 6, 2014

(86) PCT No.: PCT/CN2014/079364
§ 371 (c)(1),
(2) Date: May 27, 2016

(87) PCT Pub. No.: WO2015/184640
PCT Pub. Date: Dec. 10, 2015

(65) Prior Publication Data
US 2017/0002946 A1    Jan. 5, 2017

(51) Int. Cl.
*E03D 1/33* (2006.01)
*F16K 31/26* (2006.01)
(Continued)

(52) U.S. Cl.
CPC ............. *E03D 1/33* (2013.01); *E03D 1/32* (2013.01); *E03D 1/36* (2013.01); *F16K 31/26* (2013.01);
(Continued)

(58) Field of Classification Search
CPC ........... E03D 1/087; E03D 1/12; E03D 1/125; E03D 1/304; E03D 1/32; E03D 1/33;
(Continued)

(56) References Cited

U.S. PATENT DOCUMENTS

| | | | | |
|---|---|---|---|---|
| 1,475,582 A * | 11/1923 | Herty | ...................... | E03D 1/125 4/373 |
| 3,049,010 A * | 8/1962 | Holderith | ................ | F16K 33/00 73/322.5 |
| 4,471,798 A * | 9/1984 | Johannesen | ............... | E03D 1/33 137/135 |
| 5,661,855 A * | 9/1997 | Osmond | ................... | E03D 1/00 137/135 |
| 6,244,292 B1 * | 6/2001 | Antunez | ................. | F16K 21/18 137/218 |
| 6,510,866 B2 * | 1/2003 | Li | .............. | E03D 1/32 137/2 |
| 6,659,125 B1 * | 12/2003 | Autunez | ................... | E03D 1/32 137/414 |
| 8,640,672 B2 * | 2/2014 | Carlstrom | ............... | F02B 37/02 123/323 |

(Continued)

Primary Examiner — Mary McManmon
Assistant Examiner — Richard K Durden
(74) Attorney, Agent, or Firm — Leong C. Lei

(57) ABSTRACT

A major water leak prevention apparatus for a water inlet valve, in which a water receptacle tray is mounted on a water inlet valve body and includes an overflow port. The water receptacle tray has a bottom in which an opening is formed. A counterweight float is mounted on the water inlet valve body and includes a water compartment and a buoyance compartment arranged at a lower end of the water inlet valve body. The bottom opening of the water receptacle tray is connected via a passageway pipe to the counterweight float. The water compartment selectively blocks a lower end opening of the passageway pipe or opens the lower end opening of the passageway pipe. This arrangement helps stop water ingress through the water inlet valve when major water leakage occurs in a water tank.

7 Claims, 12 Drawing Sheets

(51) Int. Cl.
    *E03D 1/32*      (2006.01)
    *E03D 1/36*      (2006.01)
    *F16K 31/24*     (2006.01)

(52) U.S. Cl.
    CPC ......... *F16K 31/24* (2013.01); *Y10T 137/2849* (2015.04); *Y10T 137/7329* (2015.04)

(58) Field of Classification Search
    CPC ... E03D 1/35; E03D 1/36; F16K 31/18; F16K 31/20; F16K 31/22; F16K 31/24; F16K 31/26; F16K 31/28; F16K 33/00; Y10T 137/2849; Y10T 137/2856; Y10T 137/7329
    USPC .... 4/373, 391, 394, 395, 669; 137/143, 144, 137/400
    See application file for complete search history.

(56) References Cited

U.S. PATENT DOCUMENTS

| | | | |
|---|---|---|---|
| 9,441,354 B2* | 9/2016 | Liu | E03D 1/32 |
| 9,464,420 B2* | 10/2016 | Magar | E03D 1/00 |
| 2013/0068321 A1* | 3/2013 | Guthrie | F16K 31/34 |
| | | | 137/434 |
| 2013/0198944 A1* | 8/2013 | Liu | E03D 1/00 |
| | | | 4/415 |
| 2015/0074894 A1* | 3/2015 | Kim | E03D 1/308 |
| | | | 4/395 |
| 2016/0168834 A1* | 6/2016 | Magar | E03D 1/32 |
| | | | 137/434 |
| 2017/0002555 A1* | 1/2017 | Liu | E03D 1/32 |

* cited by examiner

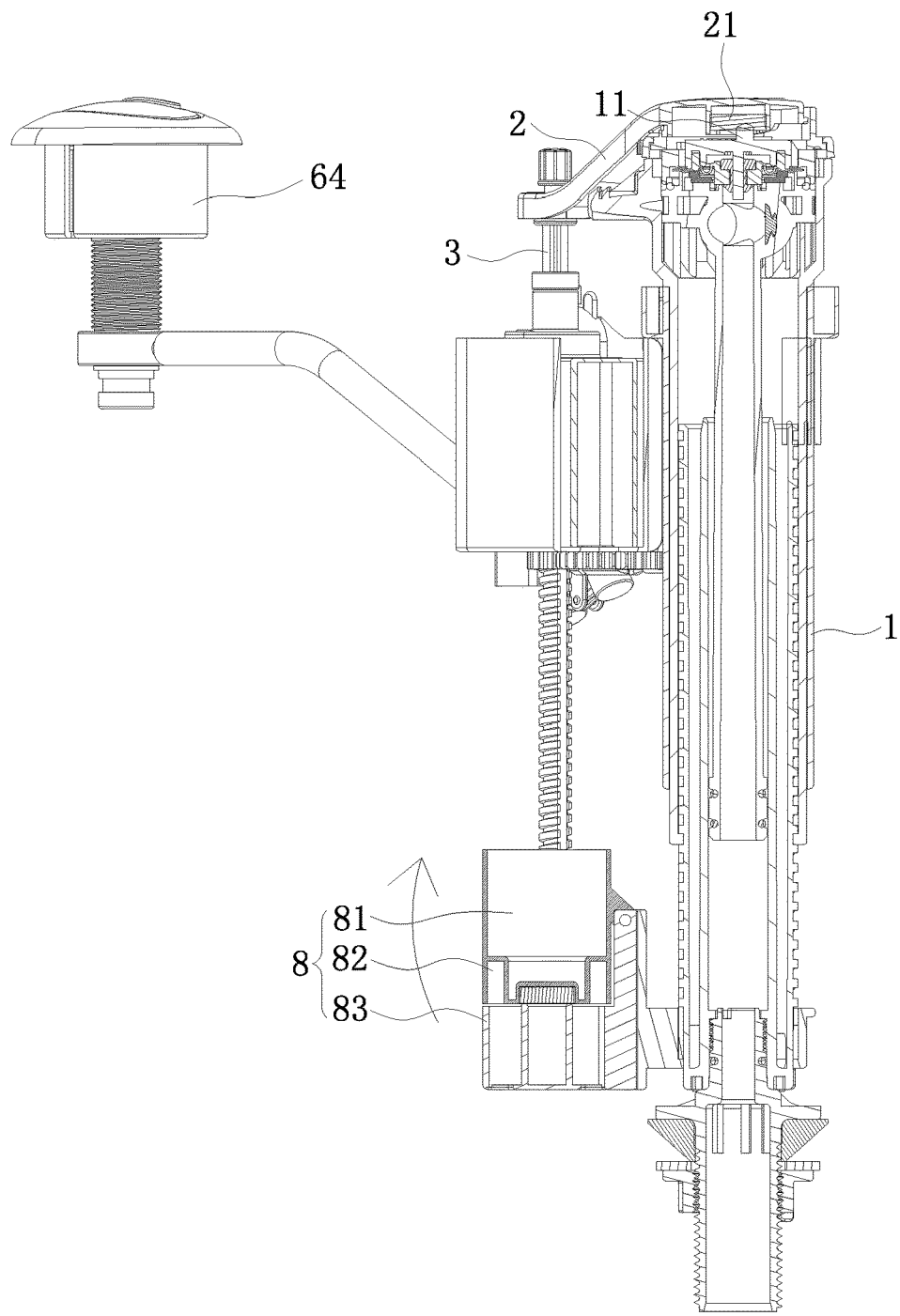
F I G. 6

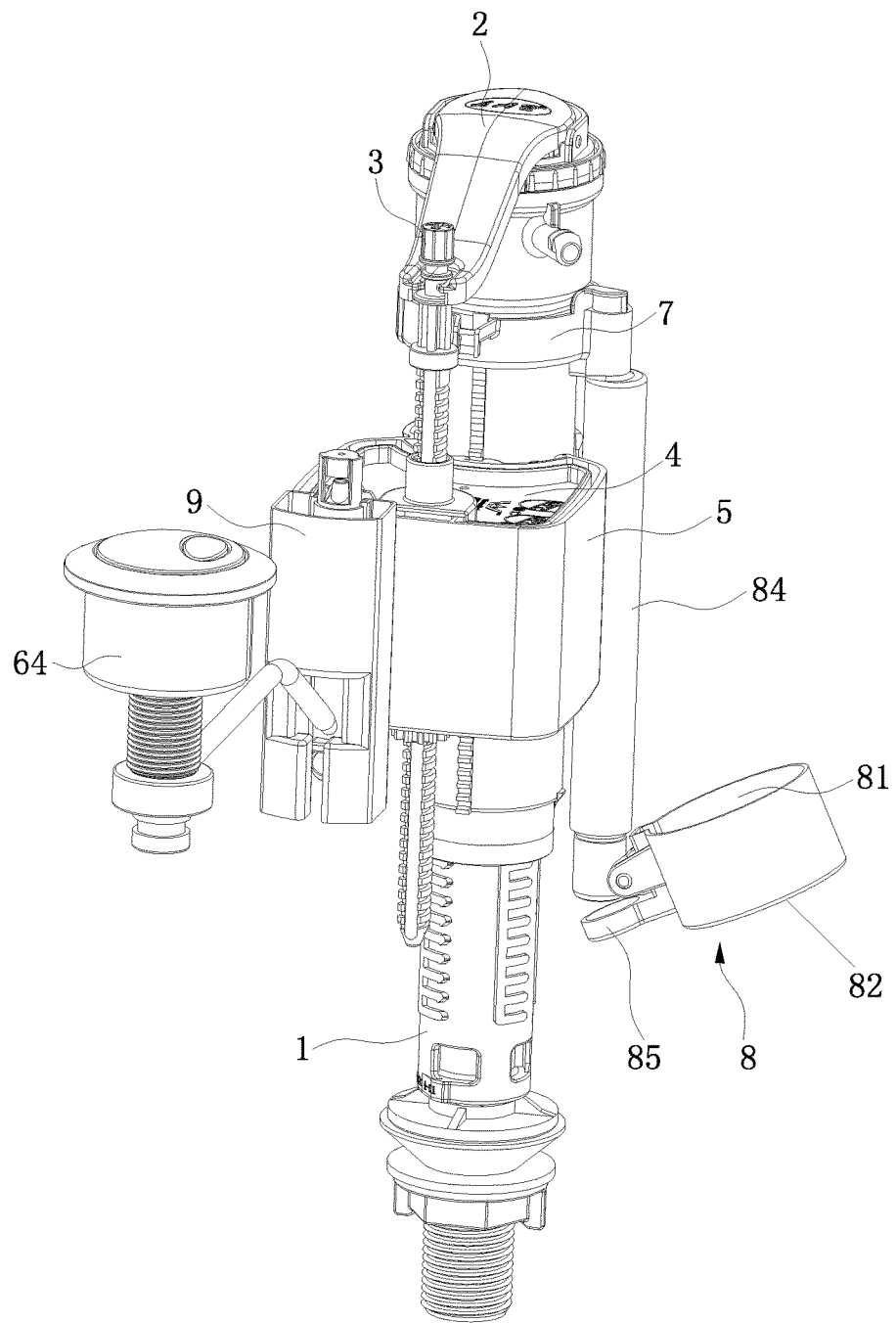
F I G. 10

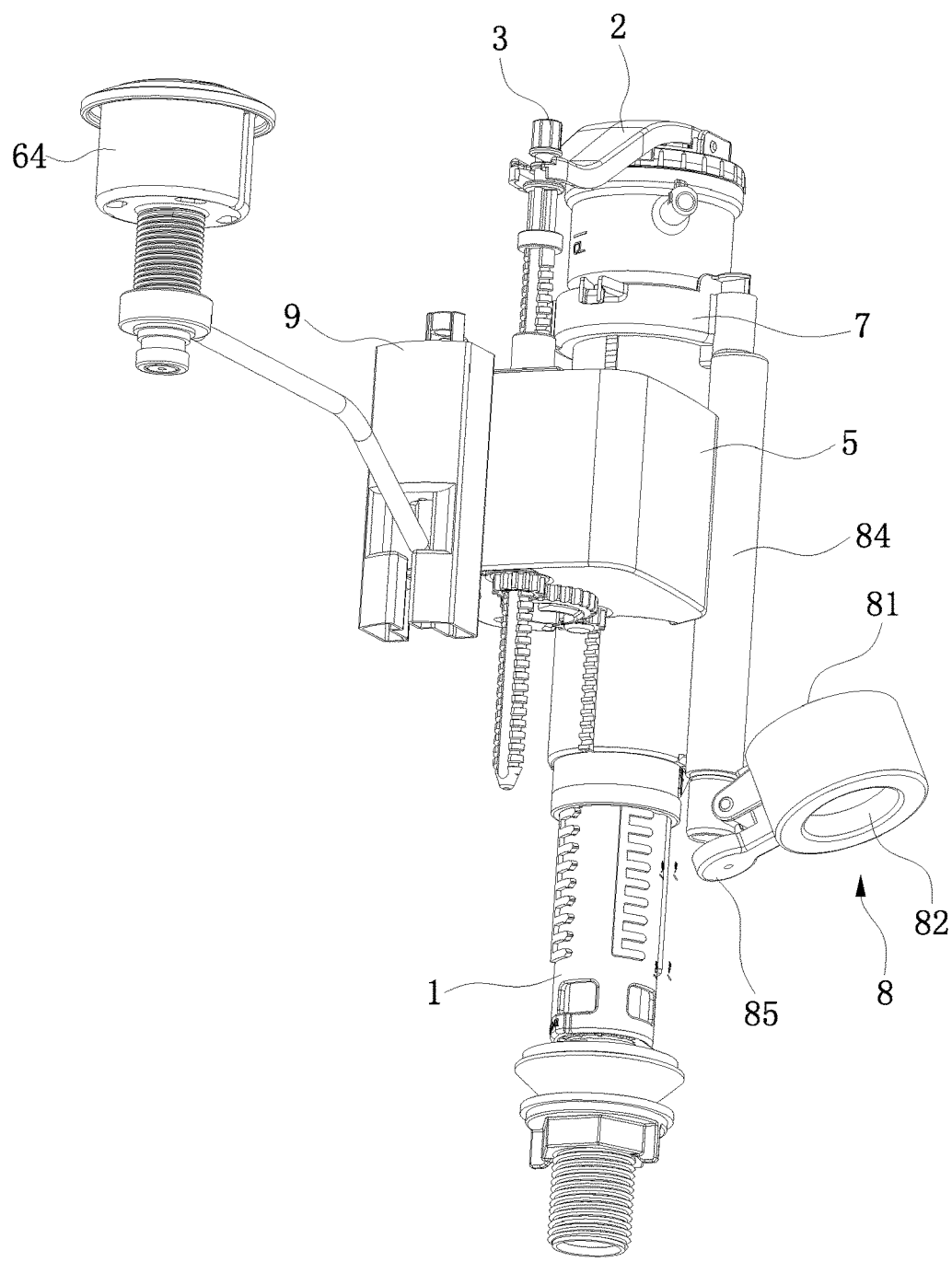
F I G. 11

MAJOR WATER LEAK PREVENTION APPARATUS FOR WATER INLET VALVE

TECHNICAL FIELD OF THE INVENTION

The present invention relates generally to the technical field of water inlet valves, and more particularly to a major water leak prevention apparatus for water inlet valves.

DESCRIPTION OF THE PRIOR ART

Heretofore, a water inlet valve generally comprises a water inlet tube, a top cover, a back pressure pad, a swing arm, a float, and a water container. A lower end of the water inlet tube is mounted to a water supply tube of a water tank. The top cover is set on an upper end on the water inlet tube. The cover is formed with a back pressure hole. The swing arm has a middle section that is pivotally mounted on the top cover. An end of the swing arm corresponds to the back pressure hole and is provided with the back pressure pad. An opposite end of the swing arm is connected to a regulation bar of the float. The float is arranged in the water container and the water container is mounted on the water inlet tube. Sealing members are provided among these components to secure water tightness.

In use, when water level of the water container drops, the float is driven by gravity to descend, causing the swing arm to rotate so that the back pressure pad opens the back pressure hole to allow water that flows through the water supply tube to move through the water inlet tube, the top cover, and the back pressure hole to enter the water tank, achieving water ingress. After the water levels of the water container rises, the float is brought upward by buoyancy so as to cause the swing arm to rotate, making the back pressure pad re-close the back pressure hole, whereby a water stop pad generates back pressure expansion to block the water ingress opening, and thus shutting down water ingress.

Such a water inlet valve comprises a water drain hole formed in the bottom of the water container. When the water level of the water tank drops down, water contained in the water container flows through the water drain hole into the water tank to cause the float to lose buoyancy and driven by gravity to descend for causing the swing arm to rotate and open the back pressure hole for water ingress. However, after a long period of service, the water tank may malfunction which prevents proper shut down. For example, a major water leakage may occur in the water discharge valve. Under such a condition, water is maintained supplied through the water inlet valve and water continuously leaks from the water tank thereby leading to a waste of water resources.

Thus, the present invention aims to improve the structure of the water inlet valve in order to shut down water ingress through the water inlet valve in case of any event of the above-discussed situation.

SUMMARY OF THE INVENTION

An object of the present invention is to provide a major water leak prevention apparatus for a water inlet valve, which stops water ingress through the water inlet valve when major water leakage occurs in a water tank so as to help save water resources.

To achieve the above object, the present invention adopts a solution as follows:

A major water leak prevention apparatus for a water inlet valve is provided, which is mounted to a water inlet valve body and comprises a swing arm, a regulation bar, a float, a water container, a siphon tube, a water receptacle tray, and a counterweight float; the swing arm is rotatably mounted to the water inlet valve body, the swing arm having an end to which a back pressure pad is mounted to correspond to a back pressure hole of the water inlet valve body, the swing arm having an opposite end connected to the regulation bar, the float being mounted on the regulation bar and received in the water container, the water container being mounted on the water inlet valve body, the siphon tube being mounted on the water container; the water receptacle tray is mounted on the water inlet valve body and is located above the water container, the water receptacle tray comprising an overflow port formed thereon, the overflow port being opposite to the water container, the water receptacle tray having a bottom in which an opening is formed; and the counterweight float is mounted on a lower end of the water inlet valve body, the counterweight float comprising a water compartment and a buoyance compartment, the water compartment and the buoyance compartment being independent of each other but integrated together, the water compartment and the buoyance compartment being arranged at the lower end of the water inlet valve body, the bottom opening of the water receptacle tray being connected, via a passageway pipe, to the counterweight float, wherein in a condition where the weight of the water compartment is greater than the buoyance of the water compartment, the water compartment blocks a lower end opening of the passageway pipe; and in a condition where the weight of the water compartment is smaller than the buoyance of the water compartment, the water compartment opens the lower end opening of the passageway pipe.

The counterweight float further comprises a fixation seat, the fixation seat being mounted to the lower end of the water inlet valve body, the fixation seat comprising a water discharge opening in communication with the lower end opening of the passageway pipe, the water compartment and the buoyance compartment being mounted, movably, to the fixation seat in an up-and-down slidable manner, wherein the up-and-down slidable manner is such that the buoyance compartment is provided with a support frame mounted thereto and the support frame is fit in the water discharge opening of the fixation seat, wherein an engagement block is mounted to a lower end of the support frame and an engagement strip is mounted in the fixation seat and wherein in the condition that the water compartment blocks the water discharge opening of the fixation seat, a lower end of the engagement strip is spaced from the engagement block; and in the condition that the water compartment opens the water discharge opening of the fixation seat, the engagement block is in contact engagement with the lower end of the engagement strip so as to stop or restrict upward movement of the water compartment and the buoyance compartment.

The counterweight float further comprises a closure seat, the closure seat being arranged at one side of the water compartment and the buoyance compartment, the counterweight float being rotatably mounted to the lower end of the passageway pipe, wherein in a condition where the weight of the water compartment is greater than the buoyance of the water compartment, the water compartment and the buoyance compartment swing downward and sink down so that the closure seat blocks the lower end opening of the passageway pipe; and in a condition where the weight of the water compartment is smaller than the buoyance of the water compartment, the water compartment and the buoyance compartment swing upward and float up so that the water compartment opens the lower end opening of the passageway pipe.

A counterweight buoyance switch is further included, the counterweight buoyance switch being mounted on the water container, the counterweight buoyance switch comprising a counterweight water compartment and a buoyance water compartment that are independent of each other, the counterweight water compartment having a lower end in which a water drain hole is formed, an upper end of the siphon tube being provided with an air aperture, the counterweight water compartment having an upper end to which a closure pressing plate is provided, the closure pressing plate corresponding to the air aperture, the counterweight buoyance switch controlling opening/closing of the air aperture.

Further, the counterweight buoyance switch is mounted on the siphon tube in an up-and-down slidable manner, wherein in a condition where buoyance of the counterweight buoyance switch is greater than the weight thereof, the counterweight buoyance switch slides upward and thus float up thereby opening the air aperture of the siphon tube; and in a condition where the buoyance of the counterweight buoyance switch is smaller than the weight thereof, the counterweight buoyance switch slides downward and sinks down thereby making the closure pressing plate block the air aperture and thus closing the air aperture of the siphon tube.

Further, the counterweight buoyance switch is rotatably mounted, through a pivot pin, to the water container wherein in a condition where the buoyance of the counterweight buoyance switch is greater than the weight thereof, the counterweight buoyance switch swings upwards and floats up thereby opening the air aperture of the siphon tube and in a condition where the buoyance of the counterweight buoyance switch is smaller than the weight thereof, the counterweight buoyance switch swings downward and sinks down, making the closure pressing plate block the air aperture thereby closing the air aperture of the siphon tube.

Further, an air evacuation hole is formed in a lower end portion of the siphon tube, the air evacuation hole being connected, via the passageway pipe, with an air pump, whereby actuating the air pump to evacuate air from the siphon tube releases pressure from the siphon tube so that water of the water container is drained through the siphon tube.

Further, a leverage bar is pivotally connected to the water container, the leverage bar having an end to which a counterweight is mounted and an opposite end that is provided with a closure pad corresponding to and mateable with the water egress opening of the siphon tube, the closure pad being opposite to the water egress opening such that in a condition where the air pump evacuate away air from the siphon tube, the closure pad closes the water egress opening.

Further, a link bar is pivotally connected to the water container, the link bar having an end corresponding to the float received in the water container and an opposite end connected to a pull wire, the pull wire being connected to an actuation button, whereby actuating the actuation button pulls the pull wire to make the link bar swing and one end of the link bar depresses the float down to have water contained in the water container drained through the siphon tube.

A major water leak prevention apparatus for a water inlet valve is provided, which is mounted on a water inlet valve body and comprises a swing arm, a regulation bar, a float, a water container, and a link bar; the swing arm is rotatably mounted to the water inlet valve body, the swing arm having an end to which a back pressure pad is mounted to correspond to a back pressure hole of the water inlet valve body, the swing arm having an opposite end connected to the regulation bar; the float is mounted to the regulation bar and is received in the water container, the water container being mounted on the water inlet valve body; and the link bar is rotatably mounted to the water container, the link bar having an end corresponding to the float received in the water container and an opposite end to which a pull wire is connected, the pull wire being connected to an actuation button so that actuating the actuation button pulls the pull wire to make the link bar swing, whereby an end of the link bar presses down the float to make water drained from the water container.

And, further included are a water receptacle tray and a counterweight float. The water receptacle tray is mounted on the water inlet valve body and is located above the water container, the water receptacle tray comprising an overflow port formed thereon, the overflow port being opposite to the water container, the water receptacle tray having a bottom in which an opening is formed; and the counterweight float is mounted on a lower end of the water inlet valve body, the counterweight float comprising a water compartment and a buoyance compartment, the water compartment and the buoyance compartment being independent of each other but integrated together, the water compartment and the buoyance compartment being arranged at the lower end of the water inlet valve body, the bottom opening of the water receptacle tray being connected, via a passageway pipe, to the counterweight float, wherein in a condition where the weight of the water compartment is greater than the buoyance of the water compartment, the water compartment blocks a lower end opening of the passageway pipe; and in a condition where the weight of the water compartment is smaller than the buoyance of the water compartment, the water compartment opens the lower end opening of the passageway pipe.

With the above solution, the water container of the present invention is not provided with an opening in a bottom thereof. When a water tank suffers continuous major water leakage, the water level of the water tank would drop down quickly such that a siphon effect is induced in the siphon tube that is mounted to the water container to drain, substantially completely, water out of the water container. The back pressure pad of the swing arm opens the back pressure hole of the water inlet valve body and water flows through the water inlet valve body into the water tank so that the water inlet valve enables water ingress.

The water receptacle tray is mounted on the water inlet valve body and water enters the water receptacle tray and flows via the opening in the bottom of the water receptacle tray into the passageway pipe. Under this condition, since the water tank is suffering major water leakage, the water compartment would lose buoyancy and the water compartment is filled with water and the water compartment blocks the lower end opening of the passageway pipe so that water that flows into the passageway pipe flows backward to pass through the overflow port of the water receptacle tray and enter the water container. Since the bottom of the water container does not have an opening, the water level in the water container raises, making the float received in the water container to ascend and driving the swing arm to rotate thereby allowing the back pressure pad to close the back pressure hole, whereby water cannot flow through the water inlet valve body into the water tank. As such, ingress of water is stopped and water resources can be save.

When it is necessary to have the water inlet valve to enable water ingress again, the float is pressed down to make water contained in the water container to drain through the siphon tube so that the water level inside the water container drops down and the float descends to drive the swing arm to rotate such that the back pressure pad opens the back pressure hole, and the water inlet valve may enable water ingress.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 6 is a schematic view illustrating an operation of a counterweight float during a normal water ingress condition.

FIG. 10 is a perspective view showing another embodiment of the counterweight buoyance switch of the present invention.

FIG. 11 is a perspective view showing another embodiment of the counterweight buoyance switch of the present invention at a different angle.

DETAILED DESCRIPTION OF THE PREFERRED EMBODIMENTS

Figure 1:
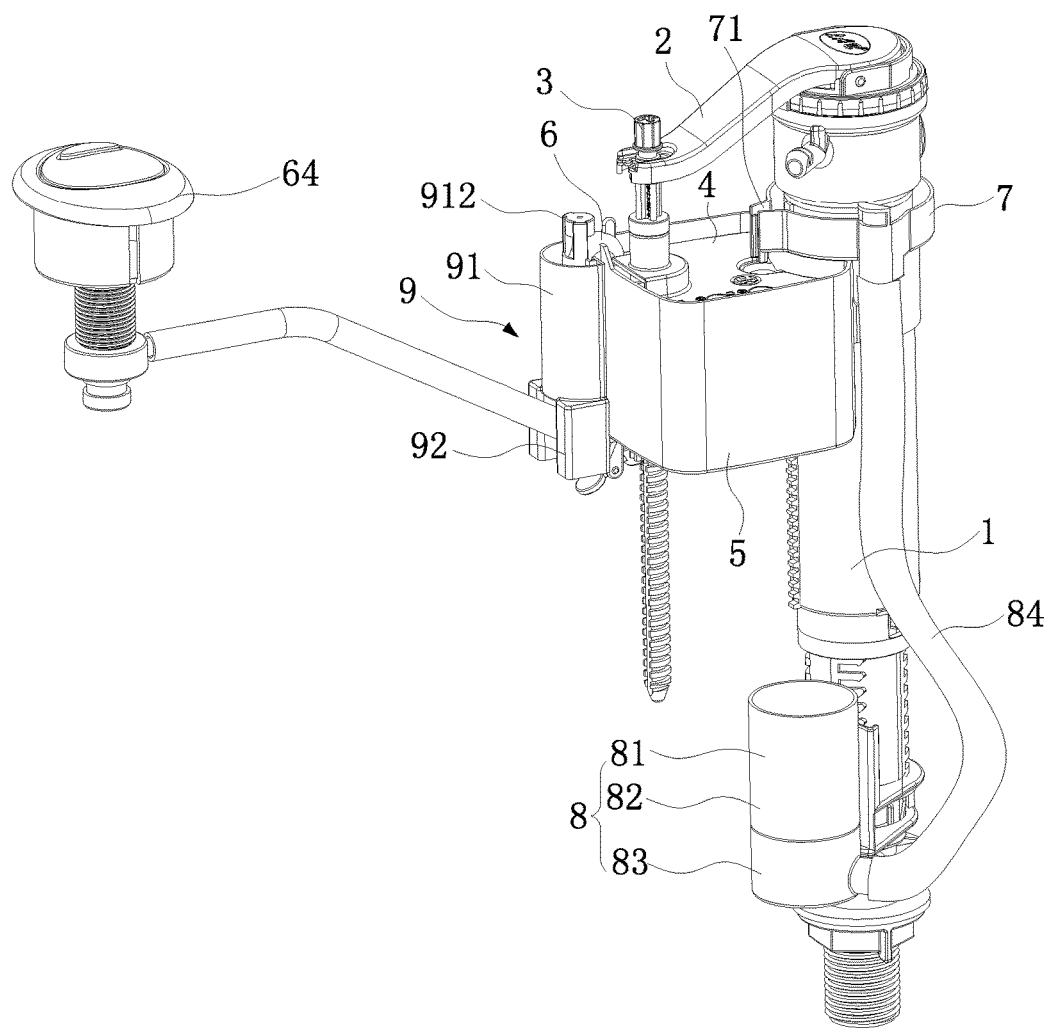
FIG. 1 is a perspective view of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-9, the present invention discloses a major water leak prevention apparatus for a water inlet valve, which is installed on a water inlet valve body 1 and comprises a swing arm 2, a regulation bar 3, a float 4, a water container 5, a siphon tube 6, a water receptacle tray 7, and a counterweight float 8.

As shown in FIG. 6, the swing arm 2 is rotatably mounted to the water inlet valve body 1. The swing arm 2 has an end to which a back pressure pad 21 is mounted to exactly correspond to a back pressure hole 11 of the water inlet valve body 1. The swing arm 2 has an opposite end connected to the regulation bar 3. The float 4 is mounted on the regulation bar 3 and is received in the water container 5. The water container 5 is mounted on the water inlet valve body 1. The structure so described is a known structure.

Figure 3:
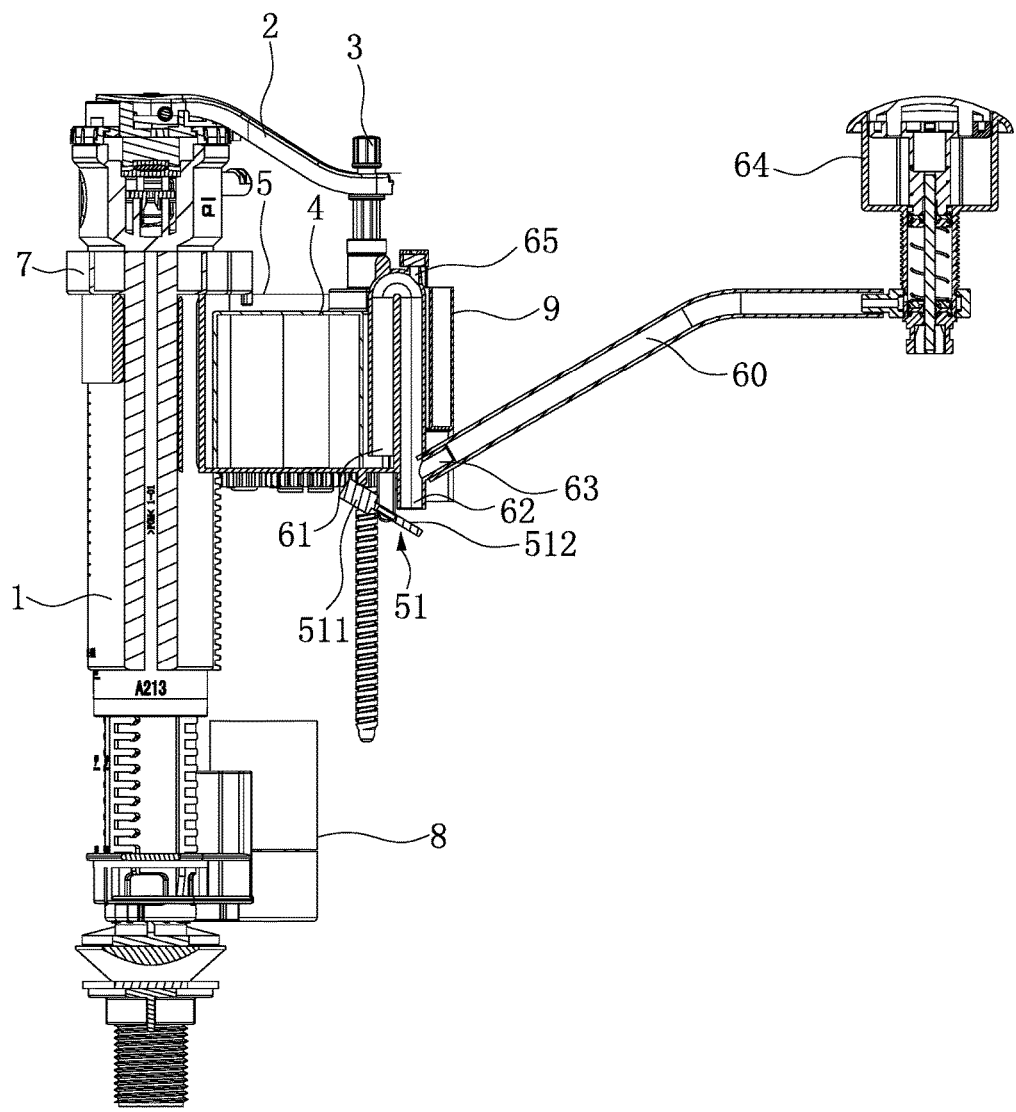
FIG. 3 is a cross-sectional view of the present invention.
Figure 4:
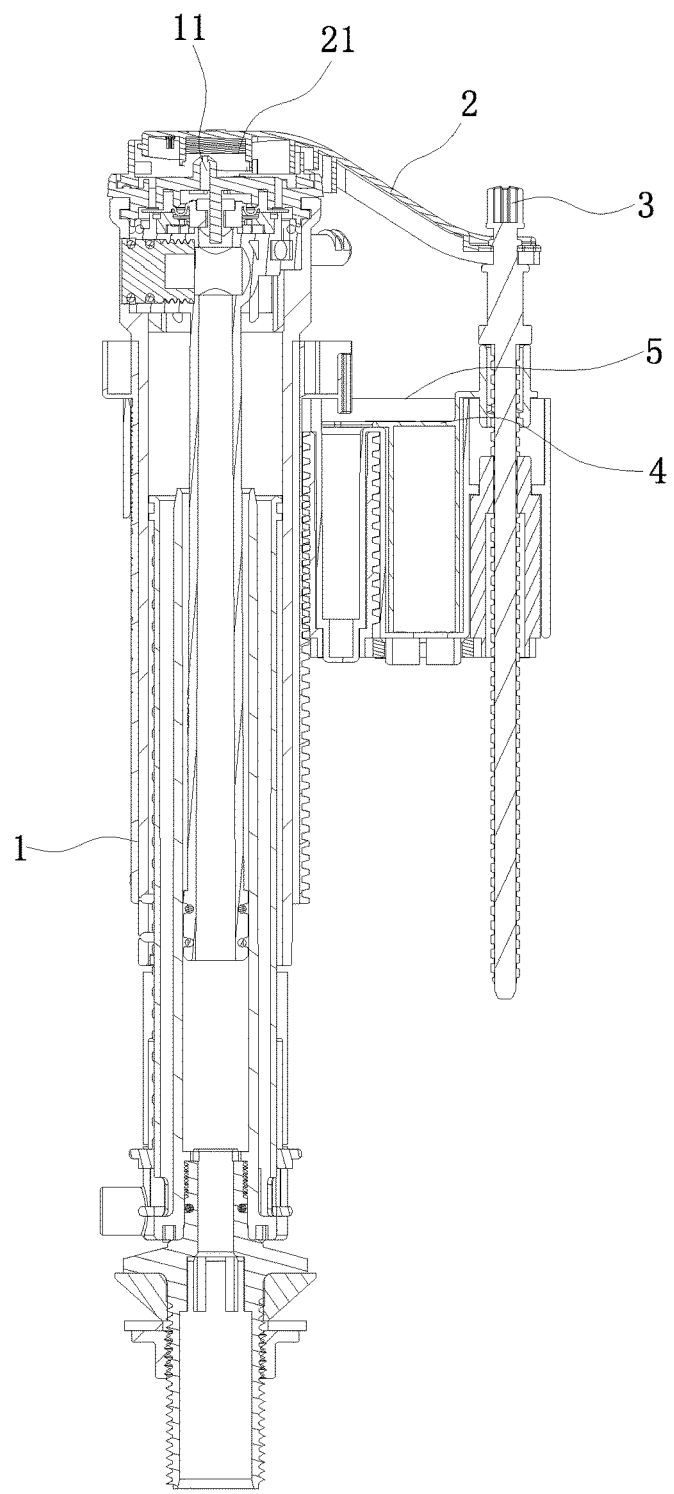
FIG. 4 is a cross-sectional view of the present invention taken from a different angle.

As shown in FIG. 3, the siphon tube 6 is mounted on the water container 5. The siphon tube 6 has a water ingress opening 61 that is located on a bottom of the water container 5. The siphon tube 6 has a water egress opening 62 that is located outside the water container 5. The water ingress opening 61 is at a height that is greater than a height of the water egress opening 62 such that the water ingress opening 61 is located higher than the water egress opening 62; and the height of the water egress opening 62 is lower than the bottom of the water container 5. The description is the common principle of the siphon tube 6.

Figure 2:
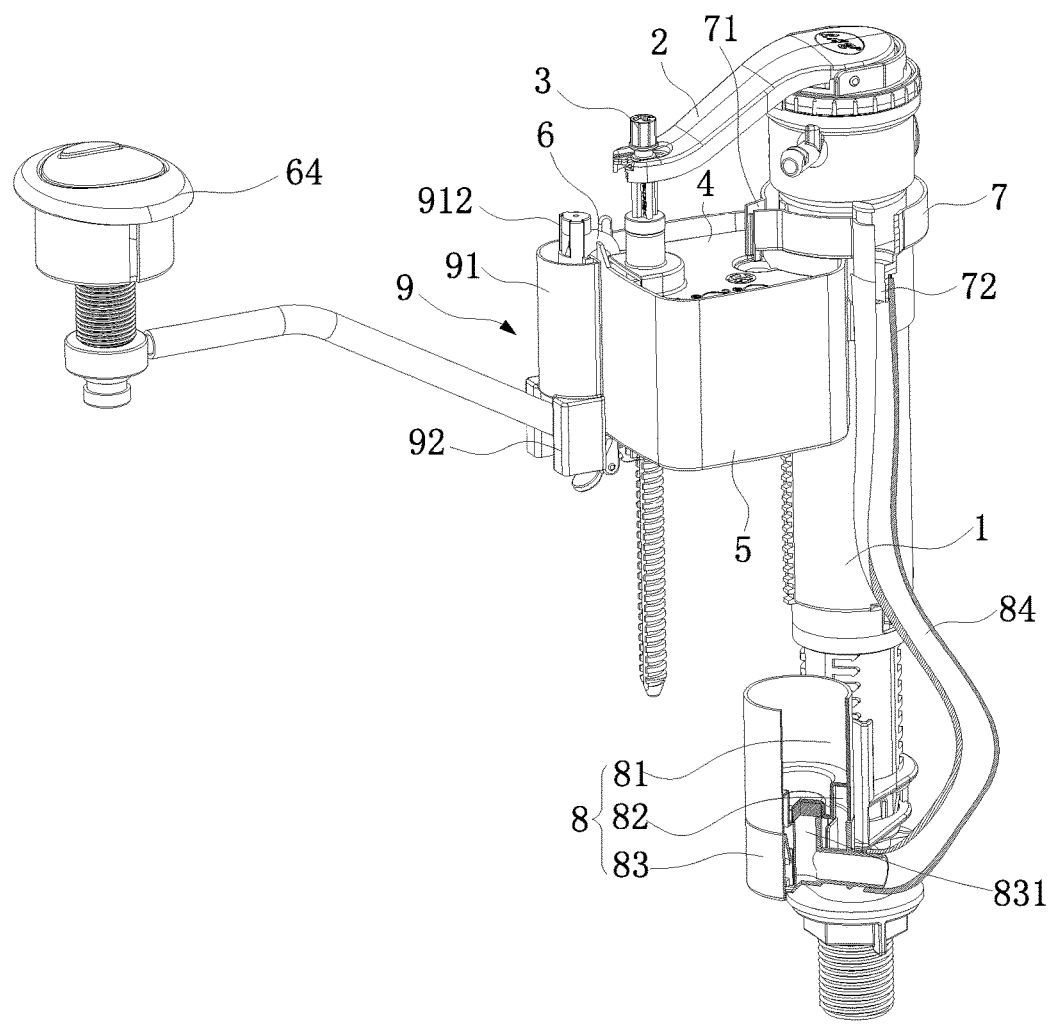
FIG. 2 is a perspective view of the present invention, partly sectioned to illustrate a counterweight float and a water receptacle tray.

As shown in FIGS. 1 and 2, the water receptacle tray 7 is mounted on the water inlet valve body 1 and is located above the water container 5. The water receptacle tray 7 comprises an overflow port 71 formed thereon. The overflow port 71 is located above the water container 5. The water receptacle tray 7 has a bottom in which an opening 72 is formed.

The counterweight float 8 is mounted on a lower end of the water inlet valve body 1. The counterweight float 8 comprises a water compartment 81 and a buoyance compartment 82. The water compartment 81 and the buoyance compartment 82 are independent of each other but are integrated together. The water compartment 81 and the buoyance compartment 82 are arranged at the lower end of the water inlet valve body 1. The bottom opening 72 of the water receptacle tray 7 is connected, via a passageway pipe 84, to the counterweight float 8. In a condition where the weight of the water compartment 81 is greater than the buoyance of the water compartment, the water compartment 81 blocks a lower end opening of the passageway pipe 84; and in a condition where the weight of the water compartment 81 is smaller than the buoyance of the water compartment, the water compartment 81 opens the lower end opening of the passageway pipe 84.

Figure 7:
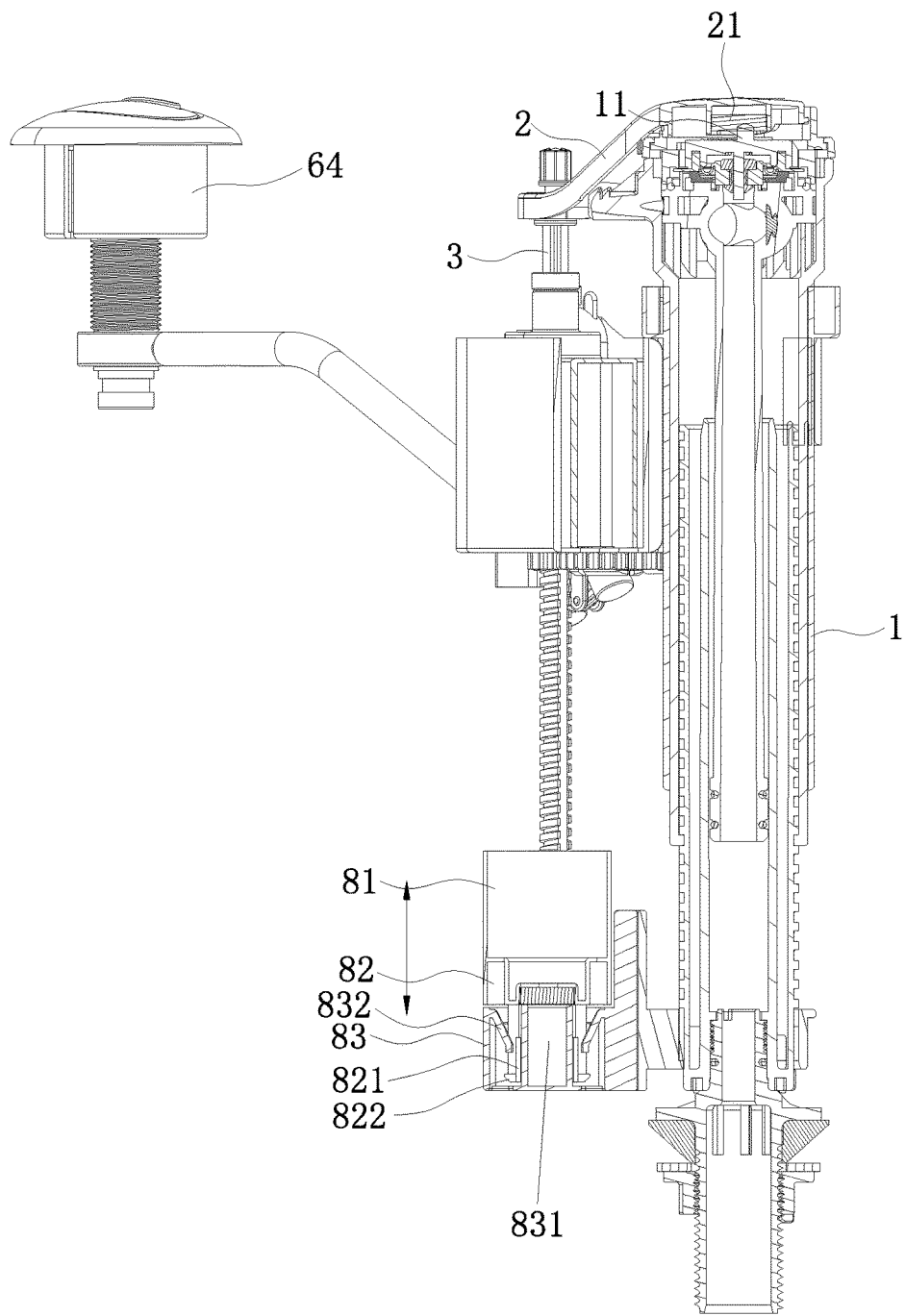
FIG. 7 is a schematic view illustrating an operation of a counterweight float during a major water leakage.

As shown in FIG. 7, the counterweight float 8 further comprises a fixation seat 83. The fixation seat 83 is mounted to the lower end of the water inlet valve body 1. The fixation seat 83 comprises a water discharge opening 831 in communication with the lower end opening of the passageway pipe 84. The water compartment 81 and the buoyance compartment 82 are mounted, movably, to the fixation seat 83 in an up-and-down slidable manner The up-and-down slidable manner is such that the buoyance compartment 82 is provided with a support frame 821 mounted thereto and the support frame 821 is fit in the water discharge opening 831 of the fixation seat 83, wherein an engagement block 822 is mounted to a lower end of the support frame 821 and an engagement strip 832 is mounted in the fixation seat 83 and wherein in the condition that the water compartment 81 blocks the water discharge opening 831 of the fixation seat 83, a lower end of the engagement strip 832 is spaced from the engagement block 822; and in the condition that the water compartment 81 opens the water discharge opening 831 of the fixation seat 83, the engagement block 822 is in contact engagement with the lower end of the engagement strip 832 so as to stop or restrict upward movement of the water compartment 81 and the buoyance compartment 82. The passageway pipe 84 can be a hose or a flexible tube.

Figure 12:
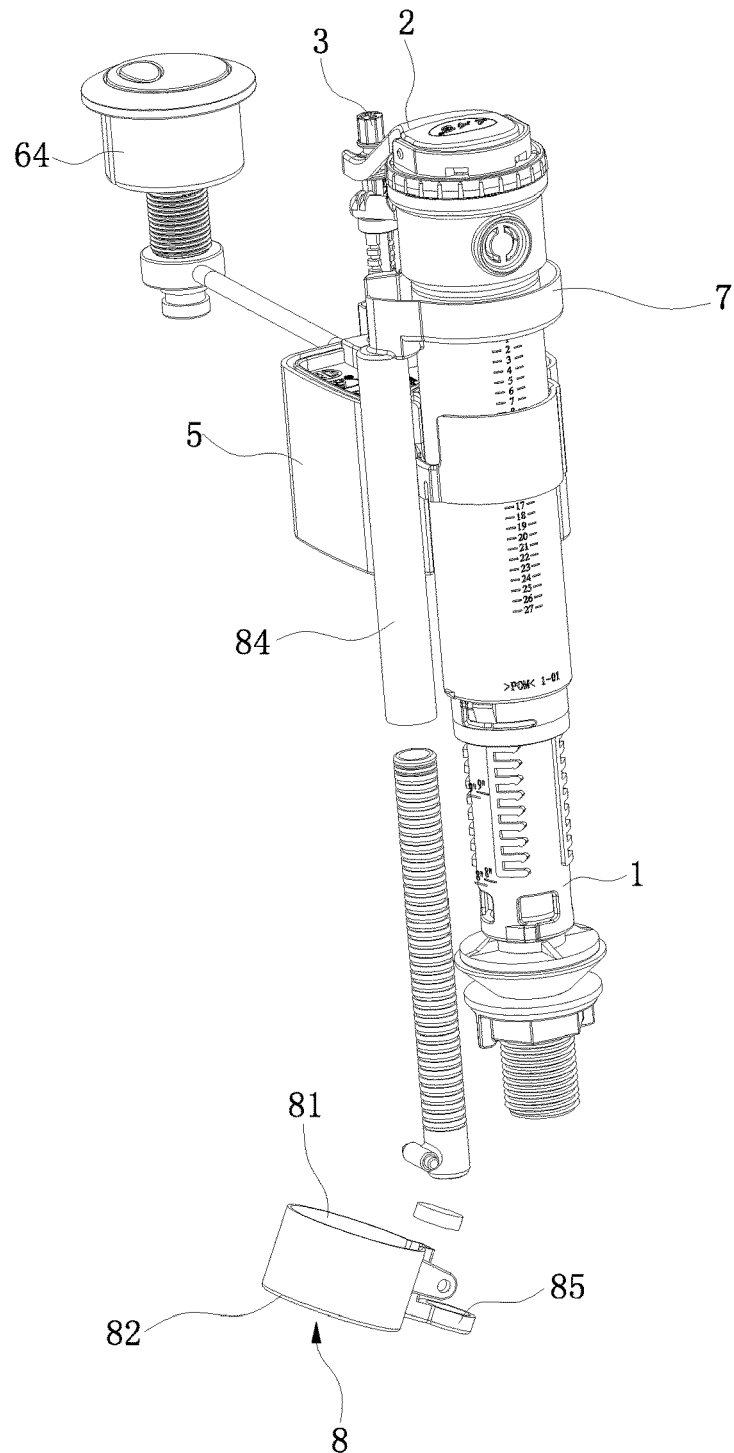
FIG. 12 is a partly exploded view of another embodiment of the present invention.

As shown in FIGS. 10-12, which are schematic views illustrating another embodiment of the counterweight float 8, the counterweight float 8 may further comprise a closure seat 85. The closure seat 85 is arranged at one side of the water compartment 81 and the buoyance compartment 82. The counterweight float 8 is rotatably mounted to the lower end of the passageway pipe 84. In a condition where the gravity of the water compartment 81 is greater than buoyance, the water compartment 81 and the buoyance compartment 82 swing downward and sink down so that the closure seat 85 blocks the lower end opening of the passageway pipe 84; and in a condition where the weight of the water compartment 81 is smaller than the buoyance of the water compartment, the water compartment 81 and the buoyance compartment 82 swing upward and float up so that the water compartment 81 opens the lower end opening of the passageway pipe 84. The passageway pipe 84 can be rigid passageway pipe that is extendable.

In the present invention, the water container 5 has a bottom that does not have an opening. When a water tank suffers continuous major water leakage, the water level of the water tank would drop down quickly such that a siphon effect is induced in the siphon tube 6 that is mounted to the water container 5 to drain, substantially completely, water out of the water container 5. The back pressure pad 21 of the swing arm 2 opens the back pressure hole 11 of the water inlet valve body 1 and water flows through the water inlet valve body 1 into the water tank so that the water inlet valve enables water ingress.

The water receptacle tray 7 is mounted on the water inlet valve body 1 and water enters the water receptacle tray 7 and flows via the opening 72 in the bottom of the water receptacle tray 7 into the passageway pipe 84. Under this condition, since the water tank is suffering major water leakage, the water compartment 81 would lose buoyance and the water compartment 81 is filled with water and the water compartment 81 blocks the lower end opening of the passageway pipe 84 so that water that flows into the passageway pipe 84 flows backward to pass through the overflow port 71 of the water receptacle tray 7 and enter the water container 5. Since the bottom of the water container 5 does not have an opening, the water level in the water container 5 raises, making the float 4 received in the water container 5 to ascend and driving the swing arm 2 to rotate thereby allowing the back pressure pad 21 to close the back pressure hole 11, whereby water cannot flow through the water inlet valve body 1 into the water tank. As such, ingress of water is stopped and water resources can be saved.

When it is necessary to have the water inlet valve to enable water ingress again, the float 4 is pressed down to make water contained in the water container 5 to drain through the siphon tube 6 so that the water level inside the water container 5 drops down and the float 4 descends to drive the swing arm 2 to rotate such that the back pressure pad 21 opens the back pressure hole 11, and the water inlet valve may enable water ingress.

Thus, the present invention comprises an air evacuation hole 63 formed in a lower end portion of the siphon tube 6. As shown in FIG. 3, the air evacuation hole 63 is connected, via the passageway pipe 60, with an air pump 64. The air pump 64 has an actuation button that is common to a button of a discharge valve. Pressing down and thus actuating the air pump 64 to evacuate air from the siphon tube 6 would release pressure from the siphon tube 6 so that water of the water container 5 is drained through the siphon tube 6 to allow for water ingress of the water inlet valve. The air pump 64 is a known technique and structure specifics will not be provided herein.

As shown in FIG. 3, to more clearly evacuate air from the siphon tube 6, the present invention comprises a leverage bar 51 pivotally connected to the water container 5. The leverage bar 51 has an end to which a counterweight 511 is mounted and an opposite end that is provided with a closure pad 512 that corresponds to and is mateable with the water egress opening 62 of the siphon tube 6. The closure pad 512 is opposite to the water egress opening 62. When the air pump 66 is actuated to evacuate air from the siphon tube 6, the closure pad 512 of the leverage bar 51 closes the water egress opening 62 of the siphon tube 6 so that evacuation of air from the siphon tube 6 can be made complete. When the siphon tube 6 drains water, said opposite end of the leverage bar 51 is spaced from the water egress opening 62.

Figure 5:
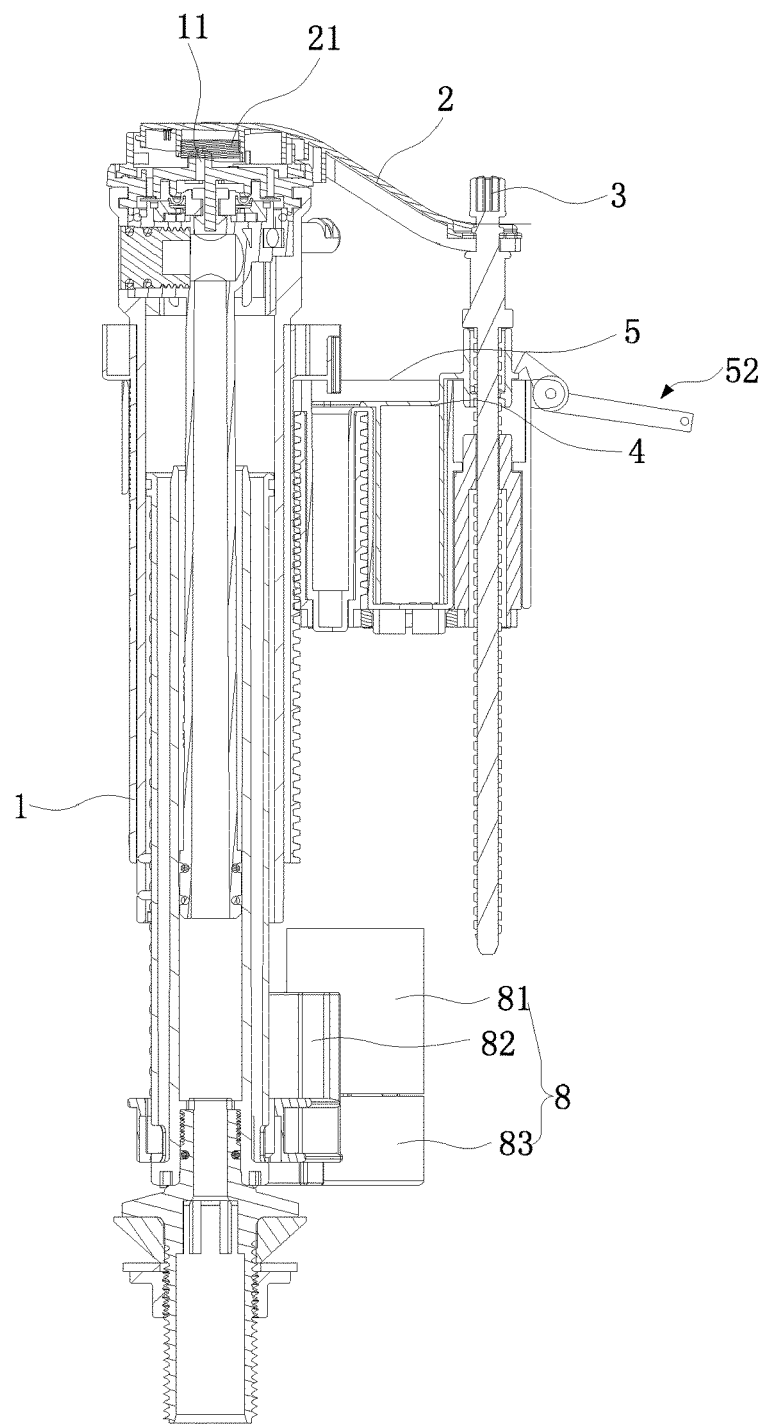
FIG. 5 is a schematic view illustrating another structure of press releasing and unlocking mechanism of the present invention.

As shown in FIG. 5, the present invention may comprise a link bar 52 pivotally connected to the water container 5. The link bar 52 has an end corresponding to the float 4 received in the water container 5 and an opposite end connected to a pull wire (not shown). The pull wire is connected to an actuation button that is common to a button of a discharge valve such that pressing down the actuation button pulls the pull wire to make the link bar 52 swing and one end of the link bar 52 depresses the float 4 to have water contained in the water container 5 drain through the siphon tube 6 thereby allowing the water inlet valve to enable water ingress.

In this way, in an event of major water leakage occurring in a water tank, the water inlet valve is closed so as to prevent water ingress thereby saving water resources. The present invention also involves the following solution for closing water inlet valve to prevent water ingress so as to handle minor water leakage (water creep or seepage) of the water tank.

Figure 8:
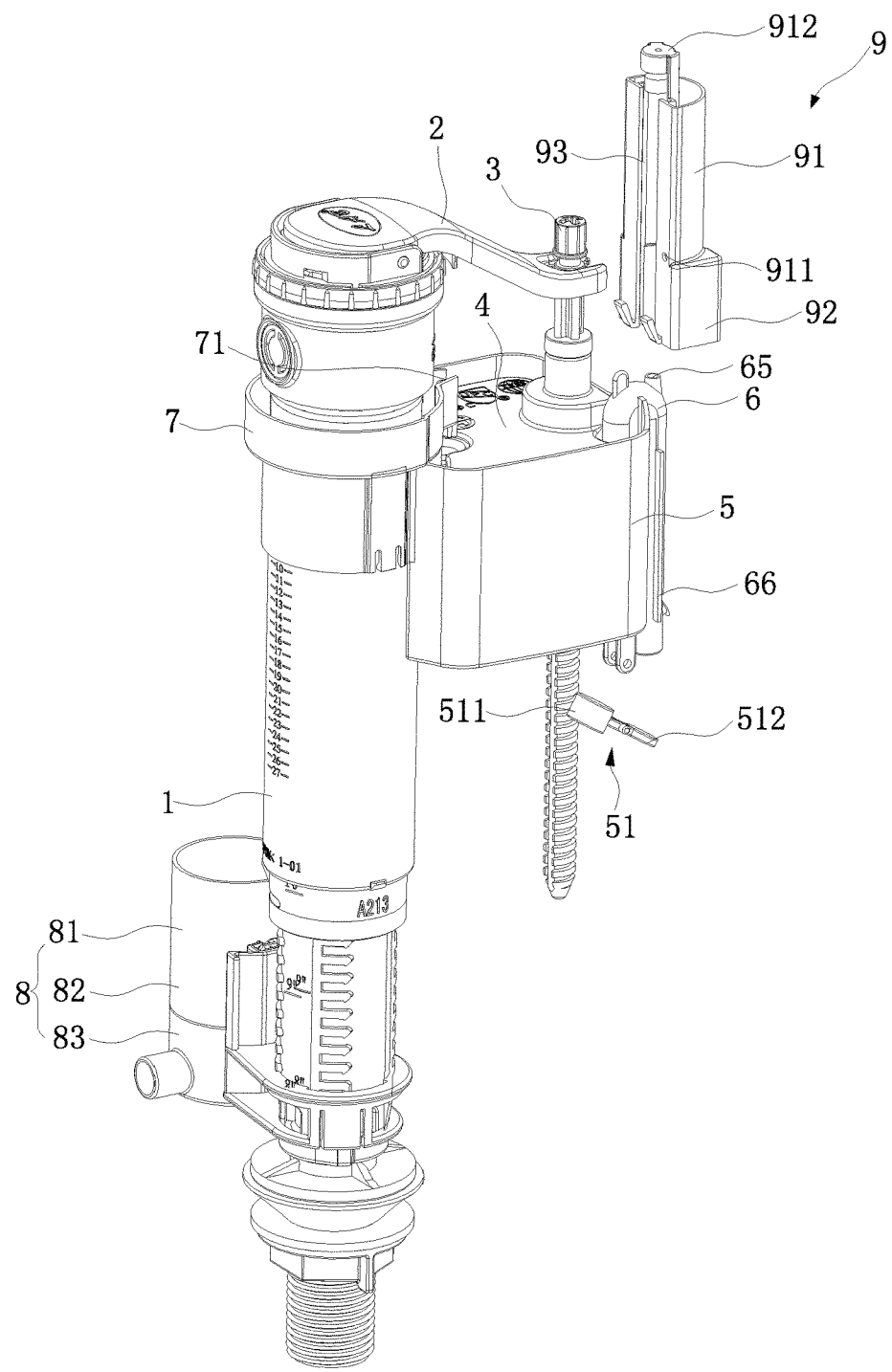
FIG. 8 is a partly exploded view of the present invention.

The present invention may further comprise a counterweight buoyance switch 9. As shown in FIGS. 1 and 2, the counterweight buoyance switch 9 is mounted on the water container 5. The counterweight buoyance switch 9 comprises a counterweight water compartment 91 and a buoyance water compartment 92 that are independent of each other. The counterweight water compartment 91 has a lower end in which a water drain hole 911 is formed. An upper end of the siphon tube 6 is provided with an air aperture 65. As shown in FIG. 8, the counterweight water compartment 91 has an upper end to which a closure pressing plate 912 is provided. The closure pressing plate 912 corresponds to the air aperture 65. The counterweight buoyance switch 9 controls opening/closing of the air aperture.

As shown in FIG. 8, the counterweight buoyance switch 9 is mounted on the siphon tube 6 in an up-and-down slidable manner. In a condition where buoyance of the counterweight buoyance switch 9 is greater than the weight thereof, the counterweight buoyance switch 9 slides upward and thus float up thereby opening the air aperture 65 of the siphon tube 6; and in a condition where the buoyance of the counterweight buoyance switch 9 is smaller than the weight thereof, the counterweight buoyance switch 9 slides downward and sinks down thereby making the closure pressing plate 912 block the air aperture 65 and thus closing the air aperture 65 of the siphon tube 6. A specific way of mounting is such that an insertion strip 66 is formed on the siphon tube 6 and an insertion slot 93 is formed in the counterweight buoyance switch 9, wherein the insertion strip 66 is inserted into the insertion slot 93 to allow the counterweight buoyance switch 9 to be mounted, in an up and down slidable manner, to the siphon tube 6.

Figure 9:
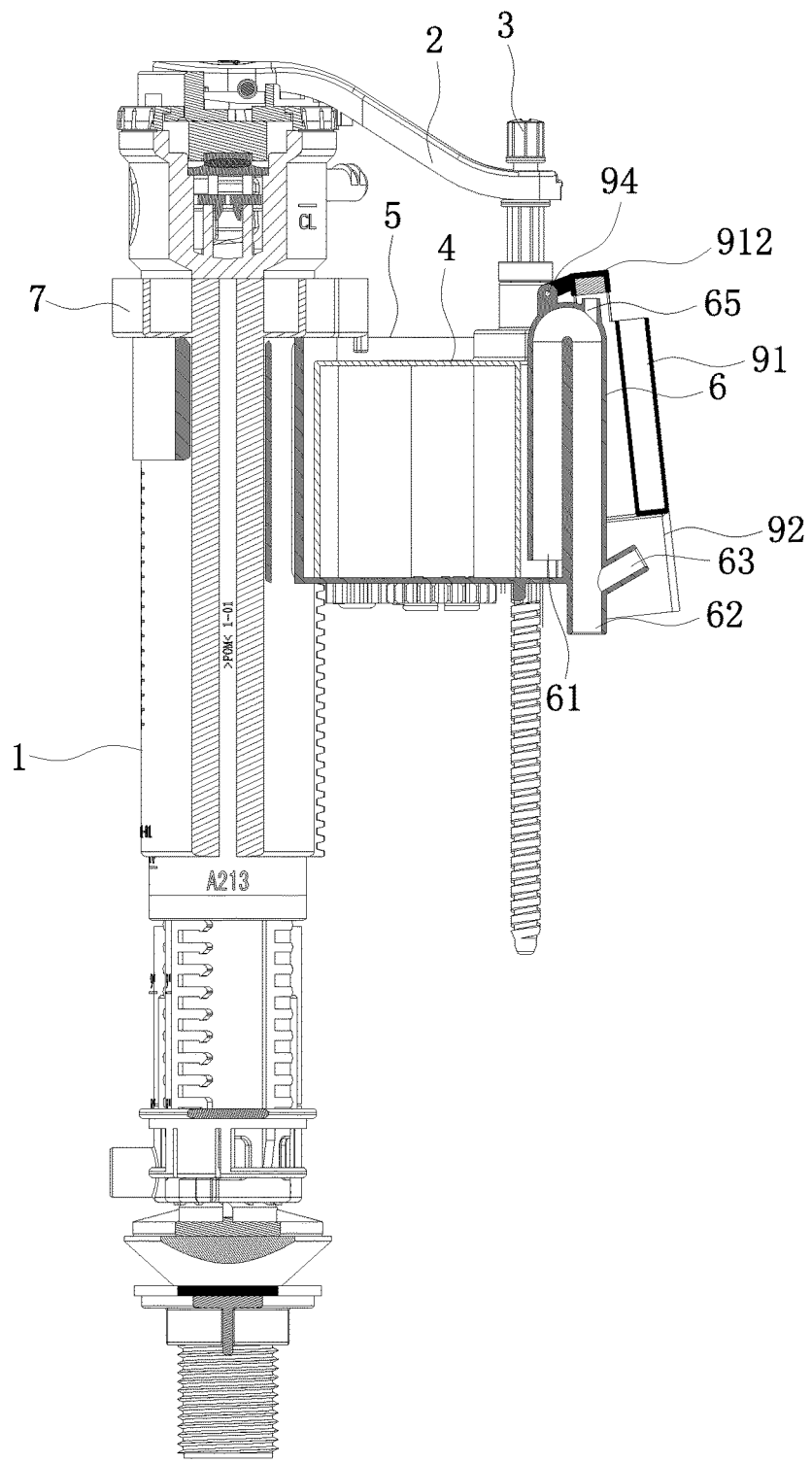
FIG. 9 is a schematic view showing another mounting structure of a counterweight buoyance switch of the present invention.

As shown in FIG. 9, the counterweight buoyance switch 9 can be rotatably mounted, through a pivot pin 94, to the water container 5. In a condition where the buoyance of the counterweight buoyance switch 9 is greater than the weight thereof, the counterweight buoyance switch 9 swings upwards and floats up thereby opening the air aperture 65 of the siphon tube 6 and in a condition where the buoyance of the counterweight buoyance switch 9 is smaller than the weight thereof, the counterweight buoyance switch 9 swings downward and sinks down, making the closure pressing plate 912 block the air aperture 65 thereby closing the air aperture 65 of the siphon tube 6.

During normal discharging, water contained in the counterweight water compartment 91 mounted to the counterweight buoyance switch 5 is constrained by the water drain hole 911 so as to drain relatively slowly. As a result, the weight of the counterweight buoyance switch 5 overcomes the buoyance provided by the lower side, which keeps the counterweight buoyance switch 5 in a down position, blocking the opening of air aperture 65 of the siphon 6, allowing water to be automatically drained from the water container 5 through the siphon.

When the water tank is continuously suffering minor water leakage (seepage or creep), the water level of the water tank slowly drops down and under this condition, the counterweight buoyance switch 9 is acted upon by the buoyance of the buoyance water compartment 92, where the buoyance acting on the counterweight buoyance switch 9 is greater than the gravity thereof, the air aperture 65 of the siphon tube 6 is opened and the siphon effect of the siphon tube 6 is released. In the present invention, the bottom of the water container 5 is not provided with an opening so that the water level inside the water container 5 does not drop and thus, the swing arm 2 is not caused to rotate and the back pressure hole 11 is not opened, whereby the water inlet valve does not allow for water ingress and the water resources can be saved.

With the water level of the water tank slowly dropping down and water contained in the counterweight water compartment 91 of the counterweight buoyance switch 9 slowly flowing out through the water drain hole 911, the counterweight buoyance switch 9 is still acted upon by the buoyance of the buoyance water compartment 92 and the buoyance of the counterweight buoyance switch 9 is still greater than the gravity thereof so that the air aperture 65 of the siphon tube 6 is kept open and no water ingress is allowed through the water inlet valve.

Continuous dropping of the water level of the water tank eventually drain off the water contained in the counterweight water compartment 91 and the counterweight buoyance switch 9 is acted upon by the gravity to close the air aperture 65 of the siphon tube 6. Under this condition, the water level of the water tank drops with a greater extent and a slower speed, making it not possible to induce is large suction force and no siphon effect is induced in the siphon tube 6, so that the water level of the water container 5 is still kept from dropping down. And, thus, water ingress through the water inlet valve is not enabled and water resources can be saved.

The present invention also discloses a major leakage prevention apparatus for a water inlet valve, which is mounted on a water inlet valve body 1 and comprises a swing arm 2, a regulation bar 3, a float 4, a water container 5, and a link bar 52. The swing arm 2 is rotatably mounted to the water inlet valve body 1. The swing arm 2 has an end to which a back pressure pad 21 is mounted to correspond to a back pressure hole 11 of the water inlet valve body 1. The swing arm 2 has an opposite end connected to the regulation bar 3. The float 4 is mounted to the regulation bar 3 and is received in the water container 5. The water container 5 is mounted on the water inlet valve body 1. The link bar 52 is rotatably mounted to the water container 5. The link bar 52 has an end corresponding to the float 4 received in the water container 5 and an opposite end to which a pull wire is connected. The pull wire is connected to an actuation button so that pressing down the actuation button pulls the pull wire to make the link bar 52 swing, whereby an end of the link bar 52 presses down the float 4 to make water drained from the water container, allowing the water inlet valve to enable water ingress.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A major water leak prevention apparatus for a water inlet valve, the major water leak prevention apparatus is mounted to a water inlet valve body and comprises a swing arm, a regulation bar, a float, a water container, a siphon tube, a water receptacle tray, and a counterweight float; the swing arm is rotatably mounted to the water inlet valve body, the swing arm having an end to which a back pressure pad is mounted to correspond to a back pressure hole of the water inlet valve body, the swing arm having an opposite end connected to the regulation bar, the float being mounted on the regulation bar and received in the water container, the water container being mounted on the water inlet valve body, the siphon tube being mounted on the water container; the water receptacle tray is mounted on the water inlet valve body and is located above the water container, the water receptacle tray comprising an overflow port formed thereon, the overflow port being located above the water container, the water receptacle tray having a bottom in which an opening is formed; and the counterweight float is mounted on a lower end of the water inlet valve body, the counterweight float comprising a water compartment and a buoyance compartment, the water compartment and the buoyance compartment being distinct compartments but integrated together, the water compartment and the buoyance compartment being arranged at the lower end of the water inlet valve body, the bottom opening of the water receptacle tray being connected, via a passageway pipe, to the counterweight float, wherein in a condition where the weight of the water compartment is greater than the buoyance of the water compartment, the water compartment blocks a lower end opening of the passageway pipe; and in a condition where the weight of the water compartment is smaller than the buoyance of the water compartment, the water compartment opens the lower end opening of the passageway pipe.

2. The major water leak prevention apparatus for a water inlet valve according to claim 1, wherein the counterweight float further comprises a fixation seat, the fixation seat being mounted to the lower end of the water inlet valve body, the fixation seat comprising a water discharge opening in communication with the lower end opening of the passageway pipe, the water compartment and the buoyance compartment being mounted, movably, to the fixation seat in an up-and-down slidable manner, wherein the up-and-down slidable manner is such that the buoyance compartment is provided with a support frame mounted thereto and the support frame is fit in the water discharge opening of the fixation seat, wherein an engagement block is mounted to a lower end of the support frame and an engagement strip is mounted in the fixation seat and wherein in the condition that the water compartment blocks the water discharge opening of the fixation seat, a lower end of the engagement strip is spaced from the engagement block; and in the condition that the water compartment opens the water discharge opening of the fixation seat, the engagement block is in contact engagement with the lower end of the engagement strip so as to stop or restrict upward movement of the water compartment and the buoyance compartment.

3. The major water leak prevention apparatus for a water inlet valve according to claim 1, wherein the counterweight float further comprises a closure seat, the closure seat being arranged at one side of the water compartment and the buoyance compartment, the counterweight float being rotatably mounted to the lower end of the passageway pipe, wherein in a condition where the weight of the water compartment is greater than the buoyance of the water compartment, the water compartment and the buoyance compartment swing downward and sink down so that the closure seat blocks the lower end opening of the passageway pipe; and in a condition where the weight of the water compartment is smaller than the buoyance of the water compartment, the water compartment and the buoyance compartment swing upward and float up so that the water compartment opens the lower end opening of the passageway pipe.

4. The major water leak prevention apparatus for a water inlet valve according to claim 1, wherein an air evacuation hole is formed in a lower end portion of the siphon tube, the air evacuation hole being connected, via a passageway pipe of the water receiving tray, with an air pump, whereby actuating the air pump to evacuate air from the siphon tube releases pressure from the siphon tube so that water of the water container is drained through the siphon tube.

5. The major water leak prevention apparatus for a water inlet valve according to claim 1, wherein a link bar is pivotally connected to the water container, the link bar corresponding to the float received in the water container and having a first end connected to a pull wire, the pull wire being connected to an actuation button, whereby actuating the actuation button pulls the pull wire to make the link bar swing and a second end of the link bar depresses the float to have water contained in the water container drained through the siphon tube.

6. A major water leak prevention apparatus for a water inlet valve, the major water leak prevention apparatus is mounted on a water inlet valve body and comprises a swing arm, a regulation bar, a float, a water container, and a link bar; the swing arm is rotatably mounted to the water inlet valve body, the swing arm having an end to which a back pressure pad is mounted to correspond to a back pressure hole of the water inlet valve body, the swing arm having an opposite end connected to the regulation bar; the float is mounted to the regulation bar and is received in the water container, the water container being mounted on the water inlet valve body; and the link bar is rotatably mounted to the water container, the link bar having a first end corresponding to the float and a second end to which a pull wire is connected, the pull wire being connected to an actuation button so that actuating the actuation button pulls the pull wire to make the link bar swing, whereby the first end of the link bar presses down the float to have water contained in the water container drain from the water container.

7. The major water leak prevention apparatus for a water inlet valve according to claim 6, further comprising a water receptacle tray and a counterweight float, wherein the water receptacle tray is mounted on the water inlet valve body and is located above the water container, the water receptacle tray comprising an overflow port formed thereon, the overflow port being located above the water container, the water receptacle tray having a bottom in which an opening is formed; and the counterweight float is mounted on a lower end of the water inlet valve body, the counterweight float comprising a water compartment and a buoyance compartment, the water compartment and the buoyance compartment being distinct compartments but integrated together, the water compartment and the buoyance compartment being arranged at the lower end of the water inlet valve body, the bottom opening of the water receptacle tray being connected, via a passageway pipe, to the counterweight float, wherein in a condition where the gravity of the water compartment is greater than buoyance, the water compartment blocks a lower end opening of the passageway pipe; and in a condition where the gravity of the water compartment is smaller than the buoyance, the water compartment opens the lower end opening of the passageway pipe.

* * * * *